United States Patent [19]

Myers

[11] Patent Number: 5,548,911
[45] Date of Patent: Aug. 27, 1996

[54] SHOPPING CART SIGN FOR DISPLAY OF ADVERTISING AND PRODUCT INDEX

[76] Inventor: Roy A. Myers, 666 Rancho Vista Rd., Vista, Calif. 92083

[21] Appl. No.: 195,283

[22] Filed: Feb. 14, 1994

[51] Int. Cl.⁶ .................................................. G09F 3/00
[52] U.S. Cl. .............................. 40/308; 40/492; 224/277
[58] Field of Search ............... 40/308, 492; 280/33.991, 280/33.992; 224/277

[56] References Cited

U.S. PATENT DOCUMENTS

| | | | |
|---|---|---|---|
| 2,845,729 | 8/1958 | Baumgart | 280/33.992 X |
| 3,677,570 | 7/1972 | Hedu | 40/308 X |
| 4,217,711 | 8/1980 | Spresser et al. | 40/308 |
| 5,280,932 | 1/1994 | Folsom | 280/33.992 |

FOREIGN PATENT DOCUMENTS

| | | | |
|---|---|---|---|
| 3502791 | 7/1986 | Germany | 40/308 |
| 2231432 | 11/1990 | United Kingdom | 40/308 |

*Primary Examiner*—Brian K. Green
*Attorney, Agent, or Firm*—John P. Halvonik

[57] ABSTRACT

An attachment device for grocery carts consisting of a pair of large plates attached to one another with one plate on each side of the front wall of the shopping cart basket. The large plates are about the same size as the front wall of the cart and act as a support surface for advertising indicia. A smaller plate is hinged to the top of the large plates and has an index for locating items in the store. The smaller piece may comprise a pair of plates of transparent material.

3 Claims, 2 Drawing Sheets

SHOPPING CART SIGN FOR DISPLAY OF ADVERTISING AND PRODUCT INDEX

BACKGROUND OF THE INVENTION

1. Field of the Invention

The invention relates to the field of shopping carts and, in particular, to a double plated attachment that is fitted to the front panel of the shopping cart. The double plates serve to display advertising indicia and a third plate may be extended outward and displays an index of the locations of the various products in the store.

Among the purposes of the invention is to save the shopper the time and trouble involved in locating store items that may not be properly indicated. Store aisles often have signs above the aisles that indicate some items (by category) in that aisle. However, such a system has its limitations-one of the most obvious being that because of the lack of space on such signs, the signs are limited to showing only those items in greatest supply in that particular aisle. Dozens of other items may be left out thereby making it difficult to find some of the lesser used items. It has been estimated by store operators that as much as two hours per day is taken up by store employees in explaining where items are to shoppers.

Another reason is that the signs offer a low cost way to advertise, especially for local businesses that may find it too expensive to place advertising in media such as television, radio, etc. The shopping carts would direct advertising to a specific locale (those who live near the shopping center and shop there would be the targets) and this may be cost effective for the small businessman.

Thus an indexing device that can be attached to the shopping cart and show the location of a great many items may save the shopper as well as the store employees valuable time. It may also put to work manufacturers of the device and otherwise create jobs. The use of the large advertising plate may offer an inexpensive source of advertising for local companies that would otherwise be forced to pursue more expensive avenues of advertising such as radio, television, etc.

2. Description of the Prior Art

While there are signs that may be attached to shopping carts, none that applicant is aware of are in any way similar to this invention nor do they have an indexing display e.g. the applicant's.

SUMMARY OF THE INVENTION

The invention is a double plate attachment for connection to the front of a shopping cart to display both advertising information and index information for the products in the store. The double plates are bolted to one another. The double plates are designated the advertising plates and are secured to the front of the basket of the cart. They provide space for display of advertising on both the inside and the outside of the cart. There is a third and smaller plate known as the index plate and is hinged to the larger, double plates. The index plate contains information relating to the location of the various products in the store. The index plate may be made of two plates of LEXAN bolted to one another.

It is an object of the invention to provide a shopping cart display apparatus that may display both indexing information of the products in the stores and advertising material and the corresponding benefits to the store and the consumer that will result in the use of such a device.

Another objective is to provide an advertising display device for stores that can be attached to carts and not interfere with the nesting of such carts and not prove a danger to others in the store.

Another objective is to provide an advertising display device for shopping carts that takes up only a minimal amount of the available space of a shopping cart and one that will not interfere with items that may extend beyond the front of the basket.

Another objective is to provide an indexing display device that may be attached to a shopping cart for use by a shopper in stores without having to look up at the display signs in aisles.

Another objective is to provide an indexing device for use in stores that can greatly reduce the time that store personnel spend in providing such information to shoppers and thereby increase the sales of merchandise in such stores.

Another objective is to provide an inexpensive and steady form of advertising to small companies that can advertise locally on the large advertising plates used in the invention.

Other objectives of the invention should be readily apparent to those skilled in the art once the invention has been shown and described.

DESCRIPTION OF THE PREFERRED EMBODIMENT

Figure 1:
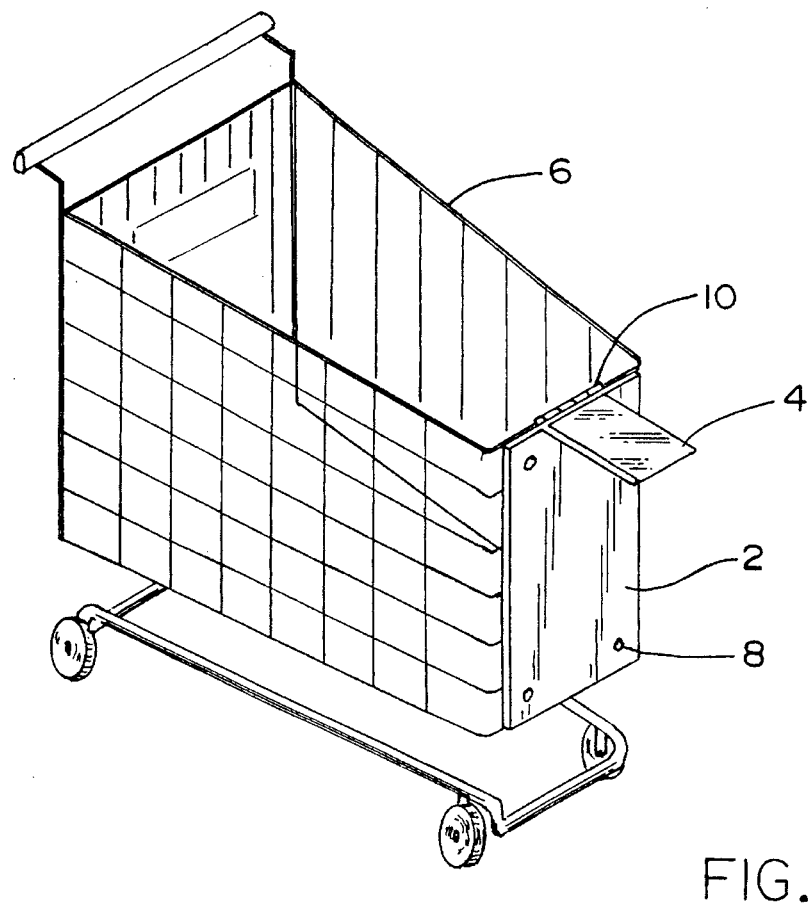
FIG. 1 Overall construction of the shopping cart with the device attached to the front.

The overall construction of the device is as shown in FIG. 1. The larger, double plates 2 and 16 are directly connected to the front wall 14 of the cart basket. Using two plates allows for advertising on both the inside and the outside of the cart. For purposes of convenience we may refer to them as the outer 2 and inner 16 plate to describe their location vis a vis the front wall of the cart. The shopper pushing the cart will see advertising on the inner plate that is facing him or her. Other shoppers will see advertising on the outer plate.

Figure 2:
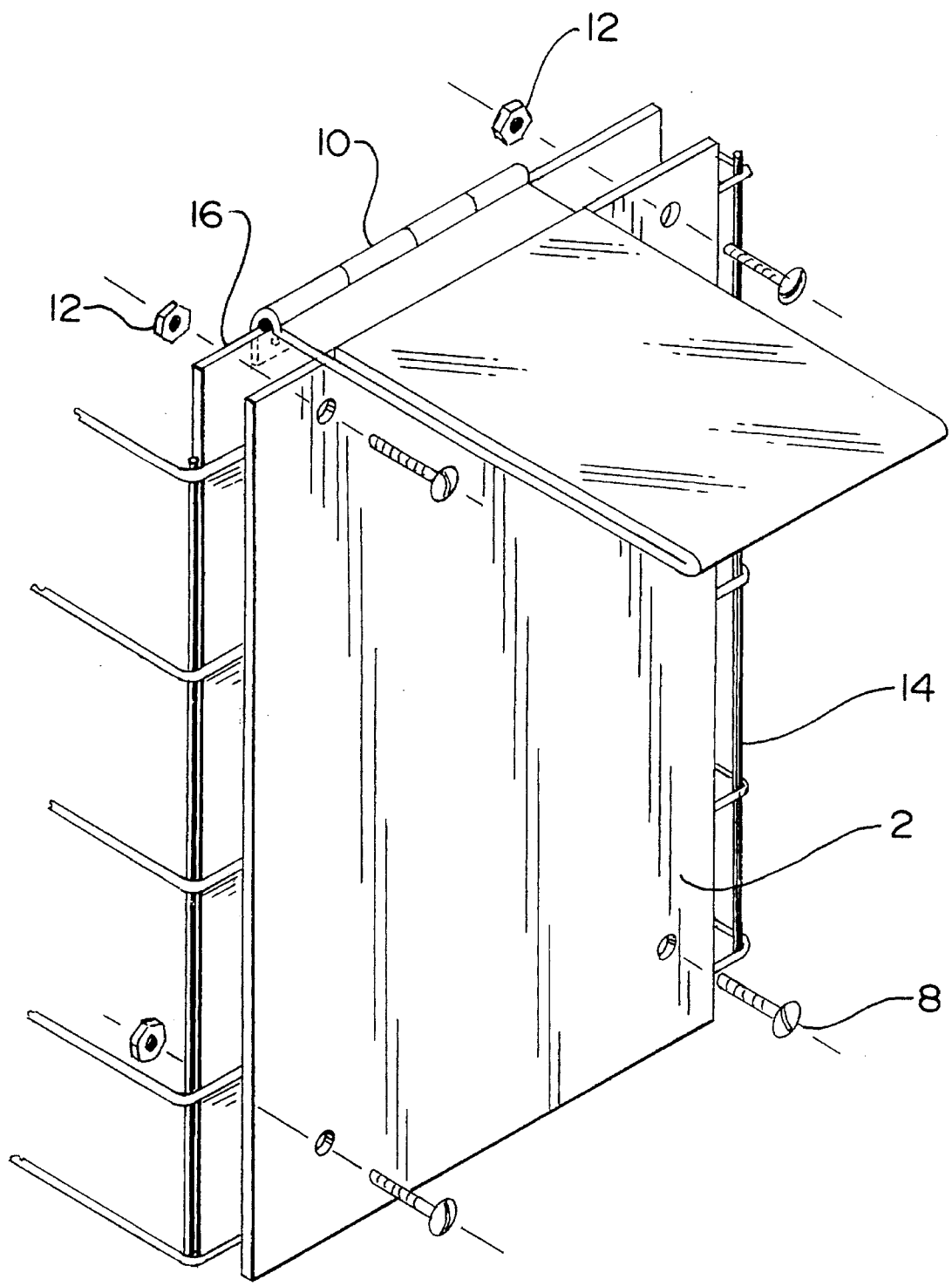
FIG. 2 Detail of plates.

A third, and smaller, plate 4 is hingedly connected to the double plates and has information relating to the location of various items in the store. This device may be referred to as the "item locator" because of its function. This device is attached to the advertising plate by a hinge 10 so that it can move from a position parallel to this plate and inside the cart to one that is perpendicular to this plate at the top of the cart, see FIG. 2. The top of the hinge is preferably about 1" above the top edge of the front face of the cart basket.

In effect then, the front wall of the basket will be sandwiched between the two, larger plates. The smaller plate may be made of two pieces of clear LEXAN with a printed information card in between the two (in this case, the item locator would then comprise two plates). The hinge can have one half connected to one of the LEXAN plates (on the item locator) and the other half connected to one of the double plates 2 or 16. It is preferred that the item locator plates may be made of clear material so that one can flip the item locator over and see information printed on the other side.

Figure 3:
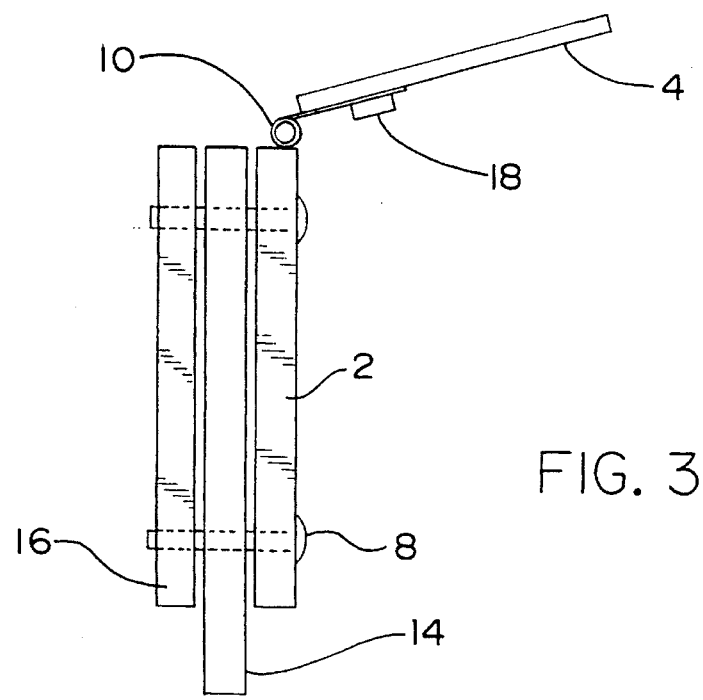
FIG. 3 Detail of hinge abutment.

The item locator can be moved upward so that it can be extended forward of the front wall of the cart at right angles to the larger plate and the front wall of the cart as shown in the figures. This may be facilitated by a small extension 18 near the base of one of the smaller plates where it joins the hinge. This extension will abut the top edge of one of the plates (in this case the outer plate as shown in FIG. 3) or that portion of the hinge that is connected to that plate and thereby limit the further movement of the smaller plate so that it is held parallel to the ground.

Thus the consumer can easily read the smaller plate from a position at the front of the cart where the consumer will oftentimes be as he or she picks items off the shelf. The indexing indicia may be printed in a direction at right angles to the hinge so that the consumer may read the index plate from a position at the side of the cart.

The advertising indicia may be directly attached to the larger plates by various means including adhesive stickers, etc. When the advertiser no longer wishes to place advertising, the indicia may be removed by heating and peeling the stickers or by other means.

Attaching the plates to the front of the cart will not result in problems in the nesting of such carts as the plates do not connect with the back panel of the cart basket (known as the "gate") that folds inward when the carts are nested. When the carts are nested, the rear gate will be folded forward but does not touch the front wall, there remains a space of about 5" in most carts between the folded up gate and the front of the cart. The inner plate (of the larger pair) will easily fit inside this space.

It is preferred that the larger plates be made of stainless steel however other materials such as: plastic (e.g. LEXAN); aluminum, other metals; etc. are possible without varying from the spirit of the invention. The larger plates will preferably be about the same size as the front part of the basket, preferably about 15" square. Other sizes are possible without varying from the spirit of the invention. The index plate is preferably smaller, about 5" by 9" and about ¼" thick. Of course the sizes may vary to accommodate various sizes of shopping carts.

The larger double plates are bolted to one another with the bolts 8 passing through the front part of the basket. It is preferred that the bolts should extend outward from the front of the cart so as not to interfere with the process of placing items in the cart (bolts shown inward in FIG. 2). The ends of the bolts should be capped with e.g. plastic or metal caps 12 in order to protect the other people in the store that may pass by the cart.

I claim:

1. A shopping cart advertising and indexing display device adapted for attachment to wheeled shopping carts having baskets; said baskets having a front and a rear wall; said device comprising: an inner and an outer advertising plate, said plates having top and bottom edges, said advertising plates of size about that of said front wall of said shopping cart, said advertising plates having advertising indicia, said advertising plates bolted to one another, a hinge means in connection with said top edge of at least one of said advertising places, a third plate having a top and bottom edge and a front surface and having indexing information on said front surface, said third plate in connection with said hinge means so that said third plate may pivot in relation to said advertising plates; said third plate having an abutment portion on said front surface and near said bottom edge of said third plates, said abutment portion placed so that said abutment portion may abut said outer plate and support said third plate in a position perpendicular to said outer plate.

2. The display device of claim 1 wherein said third plate comprises two pieces of plastic material bolted to one another.

3. The display device of claim 2 wherein said advertising plates are made of steel.

* * * * *